Patented May 22, 1951

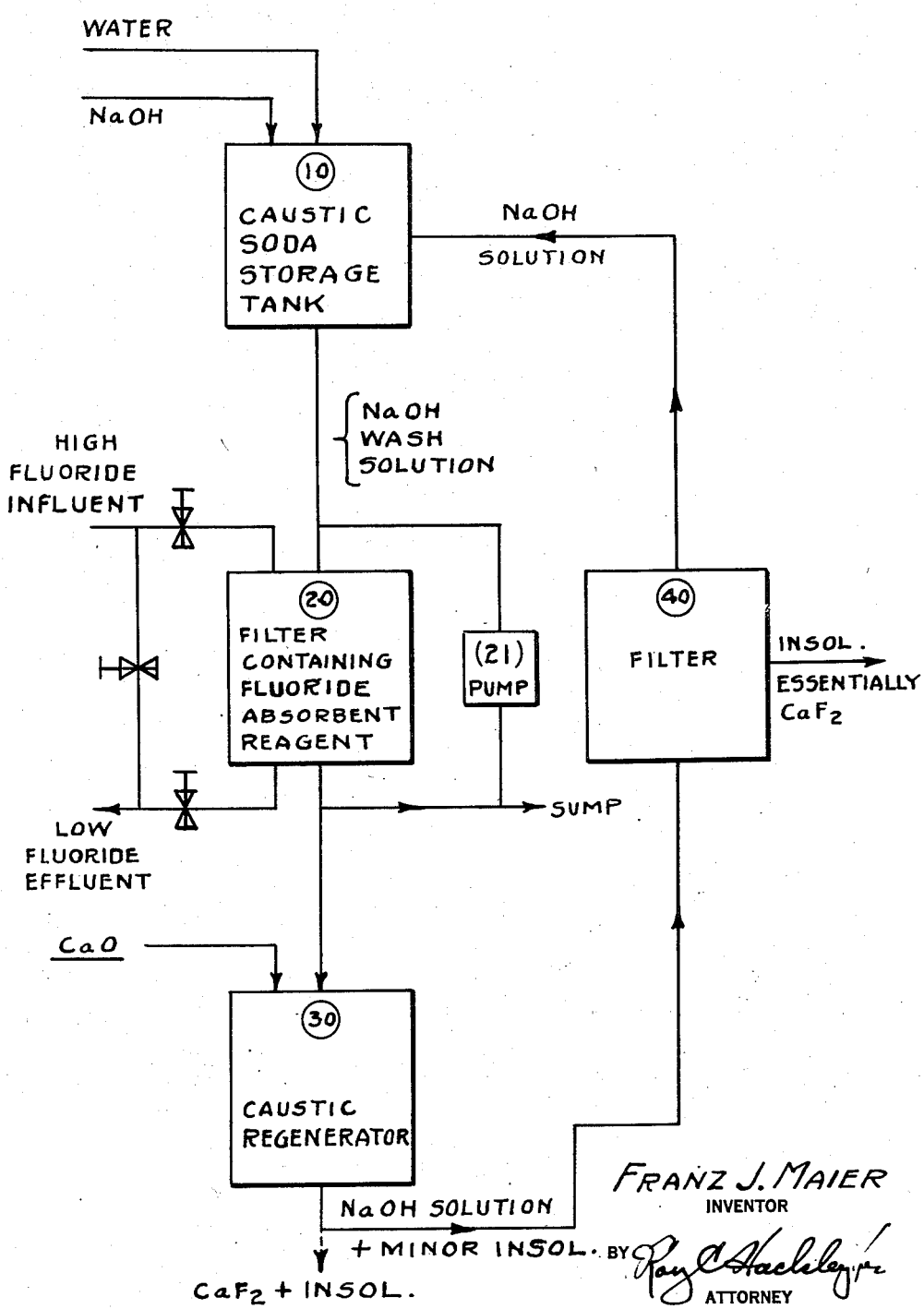

2,553,595

UNITED STATES PATENT OFFICE 2,553,595

PROCESS OF REGENERATING THE HYDROXYAPATITE OF TRICALCIUM PHOSPHATE AND TRIMAGNESIUM PHOSPHATE FOR USE AS FLUORIDE ADSORBENT REAGENTS

Franz J. Maier, Chevy Chase, Md., assignor to the United States of America as represented by the Administrator, Federal Security Agency Application April 21, 1949, Serial No. 88,871

4 Claims. (Cl. 23—109)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the regeneration of fluoride adsorbent media. Particularly the invention relates to the regeneration of the fluoride adsorbent characteristics of the hydroxyapatites of tricalcium phosphates, trimagnesium phosphates, and the like.

The hydroxyapatites are species of apatites in which the halogen atoms have been replaced by hydroxyl groups, e. g. $(Ca(OH)_2 3Ca_3(PO_4)_2$ is the hydroxyapatite of tricalcium phosphate. This material is capable of reacting with fluoride ions to form the fluorapatite, $CaF_2 3Ca_3(PO_4)_2$; which is the composition of one of the naturally occurring apatites. While the exact nature of the reaction involved removing fluorides from water are not completely understood, it is believed to be a chemical reaction occurring as shown in the following Equation 1:

(1) 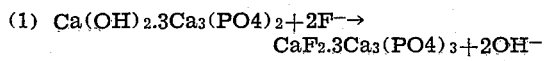
$$Ca(OH)_2.3Ca_3(PO_4)_2 + 2F^- \rightarrow CaF_2.3Ca_3(PO_4)_3 + 2OH^-$$

Hereinafter the term spent hydroxyapatite will sometimes be used when referring to the fluorapatite of Equation 1, and the mechanism by which the reaction occurs will be referred to as "adsorption."

The regeneration of the fluoride adsorbent characteristic of the hydroxyapatites of tricalcium phosphate, trimagnesium phosphate, and the like has been accomplished by treating the spent reagent with a dilute caustic solution followed by successive water, dilute acid, and water washes. Heretofore in such a process the practice has been to discard the caustic washing solution after it passed through the reagent filter bed and has therefore contributed considerably to the cost of reagent regeneration.

Accordingly, it is an object of this invention to provide an economical method for the regeneration of the fluoride adsorbent characteristics of the spent hydroxyapatites of tricalcium phosphate and trimagnesium phosphate in which the alkali wash solution is recovered and the caustic alkali regenerated to permit recycling.

Other objects and advantages will be apparent or will appear hereinafter.

These objects and advantages are accomplished in accordance with the present invention by collecting the alkali fluoride-alkali caustic solution which has passed through the reagent filter bed, and treating said solution with lime, separating therefrom the insoluble calcium fluoride, recovering the caustic alkali solution, and recycling said recovered caustic alkali solution in subsequent reagent regeneration runs, after adjusting the alkali content thereof to the concentration of the initial reagent regenerating solution.

The invention may be more readily followed by reference to Fig. 1, which is a flow sheet of the process; the invention is, however, not to be construed to the particular details shown therein.

Referring to Fig. 1, there is shown a filter tank 20 which contains in addition to filter media a fluoride adsorbent compound such as the hydroxyapatites of tricalcium phosphate and trimagnesium phosphate. Water from which the fluorides are to be removed is passed through this filter. When the fluoride adsorbent reagent in the filter becomes saturated with fluoride or spent, the water supply is caused to by-pass filter 20 or sent through another filter containing an active fluoride adsorbent reagent (not shown), or it can be shut off until the spent adsorbent is regenerated. After filter 20 has been cut out of the water system, it is filled with a dilute (about 0.75 to 2 percent NaOH) caustic soda solution from tank 10, and this solution is recirculated through the filter one or more times by suitable means such as a pump 21. Or it is retained in the filter for a time to insure completion of the ionic exchange reactions.

In the past, the practice has been to discard the wash solution to the sump, which results in complete loss of much useful caustic soda. The wash solution has been found to deteriorate with each successive cycle because of the accumulation of fluorides and other ions removed from the treated water. Usually, the caustic wash of the filter is then followed by a water wash to remove as much of the residual caustic as possible which is entrained in the filter media; the last traces are then usually neutralized by an acid wash (hydrochloric acid, carbonic acid, or other dilute acid) and another water wash. Since this particular operation is not considered as part of the present invention, it is not described in detail.

A slight excess of a quantity of a material capable of reacting with the fluoride and other ionic contaminants to form insoluble compounds is then added to the solution in the caustic regenerator 30. It is presently preferred to employ a relatively soluble basic material because of the concurrent regenerative effect on the hydroxyl ion concentrations. Suitable materials include lime, magnesium oxide, aluminum hydroxide and the like. When using lime, by metathesis, the concentration of the fluoride and other ionic contaminants will be reduced to a point where the caustic solution is reusable and the hydroxyl ion of the solution is also increased; therefore, it is often unnecessary to add additional caustic to restore the solution to its original strength as will be discussed hereinafter.

After completion of the caustic wash of the materials in filter 20, the wash solution is transferred to the caustic regenerator 30, and filter 20 is treated as aforementioned and cut back in operation in the system. At this stage various alternative procedures can be used to separate the insoluble material from the pure caustic soda solution; for example, settling and decantation, filtering, or combinations of these functions. The process as shown in Fig. 1 involves passing the treated solution through a filter 40 where the insolubles are separated and then sending the pure caustic soda solution to the caustic storage tank 10.

Heretofore the fluoride was removed in a soluble form and necessarily was discarded, but by this procedure the recovered insoluble material consists largely of calcium fluoride which can be used in various ways.

At tank 10 additional water or caustic soda is added to bring the concentration of the solution to the proper concentration (about 0.75 to 2.0 percent NaOH) and make up for minor losses in the system. The caustic solution is then in condition to be recycled through the reagent regeneration stage. Because of the tendency for caustic soda solution to pick up $CO_2$ from the atmosphere, it is preferred that the entire regeneration system be closed to exclude unnecessary admission of $CO_2$.

By this process for regeneration of the fluoride adsorbent reagent by treatment with alkali solutions, it is possible to concurrently regenerate the alkali by reducing the fluoride concentration thereof so that it can be used indefinitely. When lime is used in this process, its relatively low cost has been found to result in definite savings in the cost of treatment and make-up chemicals and further makes possible recovering the fluoride in a useful form.

From the foregoing description it is apparent that a simple process has been developed for the regeneration of the fluoride adsorbent reagents used in the treatment of water systems whereby the losses of the regenerating chemicals are greatly minimized.

While the invention as particularly described relates to the regeneration of the hydroxyapatites of tricalcium phosphate and trimagnesium phosphate, it is not to be construed as limited thereto and can be applied to other similar fluoride adsorbent reagents.

While the invention as particularly described employs caustic soda as the wash solution, it is not to be construed as limited thereto; other alkali solutions such as caustic potash can also be used in this process.

Since many widely differing embodiments of the invention will occur to one skilled in the art, the invention is not limited to the specific details illustrated and described, and various changes can be made therein without departing from the spirit and scope thereof.

What is claimed is:

1. In a process of regenerating hydroxy apatite of tricalcium phosphate and trimagnesium phosphate type fluoride adsorbent reagents which comprises treating the spent reagent with a caustic alkali solution, the improvement which comprises treating the thus formed caustic alkali-alkali fluoride solution with a water soluble alkaline compound selected from the group consisting of lime, magnesium oxide and aluminum hydroxide thereby precipitating the insoluble fluoride, and then recycling the recovered caustic alkali solution to treat fluoride adsorbent materials subsequently utilized after adjusting the alkali content thereof to the concentration of the initial adsorbent regenerating solution.

2. The process of claim 1 wherein the water soluble alkaline compound is lime.

3. The process of claim 1 wherein the water soluble alkaline compound is magnesium oxide.

4. The process of claim 1 wherein the water soluble alkaline compound is aluminum hydroxide.

FRANZ J. MAIER.

REFERENCES CITED

The following references are of record in the file of this patent:

UNITED STATES PATENTS

| Number | Name | Date |
|---|---|---|
| 1,388,276 | McKirahan | Aug. 23, 1921 |
| 1,997,691 | Koch | Apr. 16, 1935 |
| 2,151,022 | Gewecke | Mar. 21, 1939 |
| 2,371,759 | King | Mar. 20, 1945 |
| 2,417,462 | Adler | Mar. 18, 1947 |

FOREIGN PATENTS

| Number | Country | Date |
|---|---|---|
| 461,597 | Great Britain | Feb. 19, 1937 |

OTHER REFERENCES

"Recent Developments in the Phosphate Field" by H. W. Easterwood, I. & E. Chem., Jan. 1942, pages 13-14.